US009444652B2

United States Patent
Nagata et al.

(10) Patent No.: US 9,444,652 B2
(45) Date of Patent: Sep. 13, 2016

(54) RECEIVING APPARATUS, DATA RECEIVING METHOD, AND CHANNEL ESTIMATING APPARATUS AND METHOD THEREFOR

(75) Inventors: Satoshi Nagata, Tokyo (JP); Hidekazu Taoka, Munich (DE); Jianchi Zhu, Beijing (CN); Xiaoming She, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 338 days.

(21) Appl. No.: 14/112,265

(22) PCT Filed: Apr. 20, 2012

(86) PCT No.: PCT/JP2012/060764
§ 371 (c)(1),
(2), (4) Date: Nov. 4, 2013

(87) PCT Pub. No.: WO2012/144620
PCT Pub. Date: Oct. 26, 2012

(65) Prior Publication Data
US 2014/0050111 A1 Feb. 20, 2014

(30) Foreign Application Priority Data
Apr. 22, 2011 (CN) .......................... 2011 1 0111902

(51) Int. Cl.
*H04L 12/26* (2006.01)
*H04L 25/02* (2006.01)
*H04J 11/00* (2006.01)
*H04L 25/03* (2006.01)

(52) U.S. Cl.
CPC ........ *H04L 25/0202* (2013.01); *H04J 11/0036* (2013.01); *H04L 25/0204* (2013.01); *H04L 25/03891* (2013.01); *H04J 11/005* (2013.01)

(58) Field of Classification Search
None
See application file for complete search history.

(56) References Cited

U.S. PATENT DOCUMENTS

2009/0232247 A1* 9/2009 Nam et al. .......... H04L 25/0236
375/267

(Continued)

FOREIGN PATENT DOCUMENTS

JP          EP 2439997 A1 *  4/2012  ............ H04W 24/10

OTHER PUBLICATIONS

International Search Report for corresponding International Application No. PCT/JP2012/060764, mailed Jul. 10, 2012 (1 page).

*Primary Examiner* — Yemane Mesfin
*Assistant Examiner* — Jeff Banthrongsack
(74) *Attorney, Agent, or Firm* — Osha Liang LLP

(57) ABSTRACT

In the present disclosure, the UE apparatus is classified by type and the demodulation information to use in channel estimation of MUI signals is determined based on the type of the UE apparatus. The channel estimating apparatus for MUI signals has: a user type determining circuit that determines whether a UE apparatus corresponding to an own station belongs to a first type user or a second type user and determines demodulation information to use in channel estimation of MUI signals based on the type of the UE apparatus corresponding to the own station; and a channel estimating circuit that performs channel estimation of a multi-user interference signal based on the determined demodulation information to use in channel estimation of MUI signals. With this structure, it is possible to improve channel estimation accuracy and further to improve the performance of data reception and user and cell throughputs.

14 Claims, 3 Drawing Sheets

(56) References Cited

U.S. PATENT DOCUMENTS

2009/0270104 A1* 10/2009 Du et al. ............... H04W 48/02
455/436

2010/0309876 A1* 12/2010 Khandekar et al. .. H04L 5/0037
370/330
2011/0237283 A1* 9/2011 Shan et al. ............ H04L 5/0091
455/509

* cited by examiner

RECEIVING APPARATUS, DATA RECEIVING METHOD, AND CHANNEL ESTIMATING APPARATUS AND METHOD THEREFOR

TECHNICAL FIELD

The present invention relates to a radio communication technique, and particularly, to a receiving apparatus, a data receiving method, a channel estimating apparatus for multi-user interference signals and a method therefor.

BACKGROUND ART

Cellar mobile phones provide an extremely great convenience to communication of the people. The $2^{nd}$ generation global mobile communication system (GMS: Global System for Mobile Communication) provides further improvement of communication quality in mobile communication by adopting digital communication techniques. The 3rd generation partnership project (3GPP) as an important organization in the mobile communication field has extensively promoted standardization of the generation mobile communication technology (3G: The Third Generation) and established a series of communication system standards such as WCDMA (Wide Code Division Multiple Access), HSDPA (High Speed Downlink Packed Access) and HSUPA (High Speed Uplink Packet Access).

In order to address challenges of the wideband access technique and respond to growing demand for new services, the 3GPP has started standardization of the 3G long-term evolution (LTE) since the end of 2004. This is planning to improve spectrum efficiency and performance of cell-edge users, reduce system delay and provide a higher-speed access service to high-speed mobile users. The LTE-A technology provides high-speed and excellent-performance services to more mobile users by multiplying data rate and increasing the frequency bandwidth by several times based on the LTE technology.

In the LTE-A system, a multi-user Multiple-Input Multiple-Output (MU-MIMO) technique is supported. That is, in the LTE-A system, a plurality of user apparatuses (UE) can be scheduled simultaneously in same-frequency resources. In other words, in the LTE-A system, plural UE apparatuses can share frequency resources such as resource blocks. The UE apparatuses sharing same frequency resources can be called a coordinated transmission group participating in the MU-MIMO transmission. As to the UE apparatuses, they can be classified by transparency under two, a transparent UE group and a non-transparent UE group. The transparent UE means a UE apparatus that can only know its own data demodulation information (for example, a demodulation reference signal (DM-RS) port, the number of data streams of RBs assigned to itself (Rank), and so on) and cannot know whether or not there exists another UE apparatus in the present coordinated transmission group. In other words, the transparent UE apparatus does not know whether it is a single user Multiple-Input Multiple-Output (SU-MIMO) user or a MU-MIMO user. The MU-MIMO technique based on this condition is called "transparent MU-MIMO technique". The non-transparent UE is a UE apparatus that can recognize not only its own data demodulation information but also demodulation information of other UE apparatuses in the present coordinated transmission group (for example, DM-RS ports, Ranks of RBs assigned to UE apparatuses in the coordinated transmission group and so on). That is, the non-transparent UE apparatus can know that it is a SU-MIMO user or MU-MIMO user. In the LTE-A standardization process, Release 10 (Rel-10), the LTE-A system is defined as needing to support the transparent MU-MIMO technique.

In the LTE-A system (abbreviated as "MU-MIMO system") supporting the transparent MU-MIMO technique, the UE apparatus suffers from inter-cell interference (ICI) from neighbor cells and also from multi-user interference (MUI) from other users in the coordinated transmission group. As the transparent UE apparatus cannot know demodulation information of other users in the coordinated transmission group, it cannot remove MUI. For example, when an advanced receiving apparatus such as an IRC (interference Rejection Combining) receiving apparatus is used, it is possible to bring about significant gains, while suppressing interference. However, in the conventional method, as the transparent UE apparatus cannot know demodulation information of other users in the present coordinated transmission group, it cannot perform accurate interference rejection of MUI, even using the IRC receiving apparatus.

FIG. 1 illustrates an inner structure of a conventional IRC receiving apparatus. As illustrated in FIG. 1, the conventional IRC receiving apparatus has a demodulation information obtaining section 101 configured to extract demodulation information of the own station such as a DM-RS port identifier (ID), a DM-RS scrambling sequence index (SCID) and the like from physical downlink control channels (PDCCHs) of reception signals, a first channel estimating section 102 configured to perform channel estimation on downlink data channels of the own station based on the demodulation information of the own station, a second channel estimating section 103 configured to perform channel estimation on MUI signals in the reception signals, a third channel estimating section 104 configured to perform channel estimation on ICI signals in the reception signals, a reception coefficient generating section 105 configured to generate a reception coefficient based on channel estimation results of the first channel estimating section 102, the second channel estimating section 103 and the third channel estimating section 104, and a data detecting section 106 configured to perform data detection on transmission data in physical downlink shared channels (PDSCHs) of the reception signals based on the generated reception coefficient and obtain data transmitted from the base station to the own station.

In order to perform cell selection, handover and other operations, the above-mentioned IRC receiving apparatus has to have another module to measure reference signal reception power (RSRP) and reference signal reception quality (RSRQ) of reception signals.

SUMMARY OF THE INVENTION

Technical Problem

In the transparent MU-MIMO system, as the UE apparatus does not know actual MUI conditions and cannot know interference information exactly, the second channel estimating section 103 of the IRC receiving apparatus is only able to assume that the base station continues to transmit data in the maximum number of streams, during channel estimation of MUI signals. In other words, it is assumed as default that the DM-RS ports and SCIDS that are not used by the UE apparatus are occupied by other UE apparatuses in the coordinated transmission group and there occurs MUI. Accordingly, when the signal to noise ratio is high, it is possible to obtain accurate channel estimation results, however when the signal to noise ratio is low, the strength of noise to the signals is relatively high and such assumption may cause deterioration of channel estimation results and reduction in data reception performance.

Solution to Problem

The present invention was carried out in view of the foregoing and aims to provide a receiving apparatus, a data receiving method, channel estimating apparatus and channel estimating method for MUI signals, all capable of improving accuracy of channel estimation during data reception.

An aspect of the present invention is a receiving apparatus comprising: a demodulation information obtaining section configured to extract demodulation information of an own station from a physical downlink control channel (PDCCH) of a reception signal; a user type determining section configured to determine whether a UE apparatus corresponding to the own station belongs to a first type user or a second type user, the first type user being defined as assuming that during data reception, a base station transmits data in a maximum number of data streams in same frequency resources and the second type user being defined as assuming that during the data reception, the base station transmits data in a less number of data streams than the maximum number in the same frequency resources, and to determine demodulation information to use in channel estimation of multi-user interference signals based on whether the UE apparatus corresponding to the own station belongs to the first type user or the second type user; a first channel estimating section configured to perform channel estimation of a downlink data channel of the own station based on the demodulation information of the own station; a second channel estimating section configured to perform channel estimation of a multi-user interference signal in the reception signal based on the determined demodulation information to use in channel estimation of multi-user interference signals; a third channel estimating section configured to perform channel estimation of an inter-cell interference signal in the reception signal; a reception coefficient generating section configured to generate a reception coefficient based on channel estimation results of the first channel estimating section, the second channel estimating section and the third channel estimating section; and a data detecting section configured to perform data detection on a physical downlink shared channel (PDSCH) of the reception signal based on the generated reception coefficient.

Here, the user type determining section comprises: a reference signal measuring module configured to measure reference signal reception power (RSRP) or reference signal reception quality (RSRQ) of a serving base station of the own station in the reception signal and RSRP or RSRQ of a neighbor cell; a first user type determining module configured to compare the RSRP/RSRQ of the serving base station of the own station with the RSRP/RSRQ of the neighbor cell and to, when a difference between the RSRP/RSRQ of the serving base station of the own station and a maximum value of the RSRP/RSRQ of the neighbor cell is equal to or greater than a predetermined threshold, determine that the own station belongs to the first type user and when the difference between the RSRP/RSRQ of the serving base station and the maximum value of the RSRP/RSRQ of the neighbor cell is smaller than the predetermined threshold, determine that the own station belongs to the second type user; and a first demodulation information determining module configured to, when it is determined that the own station belongs to the first type user, determine all combinations of DM-RS (demodulation reference signal) port ID and SCID (scramble sequence index) excluding a DM-RS port ID and an SCID used by the own station as the demodulation information to use in channel estimation of multi-user interference signals and when it is determined that the own station belongs to the second type user, determine null (blank information) as the demodulation information to use in channel estimation of multi-user interference signals.

Or, the user type determining section comprises: a second user type determining module configured to determine whether the own station belongs to the first type user or the second type user based on the demodulation information of the own station; and a second demodulation information determining module configured to, when it is determined that the own station belongs to the first type user, determine all combinations of DM-RS port ID and SCID excluding a DM-RS port ID and an SCID used by the own station as the demodulation information to use in channel estimation of multi-user interference signals and when it is determined that the own station belongs to the second type user, determine the demodulation information to use in channel estimation of multi-user interference signals based on the demodulation information of the own station.

The second user type determining module determines whether the DM-RS port ID of the own station is greater than a predetermined threshold or not and whether the SCID of the own station is 1 or not, when the DM-RS port ID of the own station is greater than the predetermined threshold and the SCID is 1, the second user type determining module determines that the own station belongs to the first type user and when the DM-RS port ID of the own station is greater than the predetermined threshold and the SCID is not 1, the second user type determining module determines that the own station belongs to the second type user, and when it is determined that the own station belongs to the second type user, the second demodulation information determining module determines, as the demodulation information to use in channel estimation of multi-user interference signals, combinations of DM-RS port ID and SCID such that the DM-RS port ID and/or the SCID is smaller than the DM-RS port ID and/or the SCID used by the own station.

Or, the second user type determining module determines whether the DM-RS port ID is greater than a predetermined threshold or not, when it is determined that the DM-RS port ID is greater than the predetermined threshold, the second user type determining module determines that the own station belongs to the first type user and when it is determined that the DM-RS port ID is not greater than the predetermined threshold, the second user type determining module determines that the own station belongs to the second type user, and when it is determined that the own station belongs to the second type user, the second demodulation information determining module determines, as the demodulation information to use in channel estimation of multi-user interference signals, combinations of DM-RS port ID and SCID such that the DM-RS port ID is smaller than the DM-RS port ID used by the own station and the SCID is any SCID. Or, the second user type determining module determines whether the SCID is 1 or not, when it is determined that the SCID is 1, the second user type determining module determines that the own station belongs to the first type user and when the SCID is not 1, the second user type determining module determines that the own station belongs to the second type user, and when it is determined that the own station belongs to the second type user, the second demodulation information determining module determines, as the demodulation information to use in channel estimation of multi-user interference signals, combinations of DM-RS port ID and SCID such that the SCID is 0 and the DM-RS port ID is smaller than the DM-RS port ID used by the own station.

Another aspect of the present invention is a channel estimating apparatus for MUI signals comprising: a user type determining section configured to determine whether a UE apparatus corresponding to an own station belongs to a first type user or a second type user, the first type user being defined as assuming that during data reception, a base station transmits data in a maximum number of data streams in same frequency resources and the second type user being defined as assuming that during the data reception, the base station transmits data in a less number of data streams than the maximum number in the same frequency resources, and to determine demodulation information to use in channel estimation of multi-user interference signals based on whether the UE apparatus corresponding to the own station belongs to the first type user or the second type user; and a second channel estimating section configured to perform channel estimation of a multi-user interference signal based on the determined demodulation information to use in channel estimation of multi-user interference signals.

Yet another aspect of the present invention is a data receiving method comprising the steps of: defining a first type user as assuming that during data reception, a base station transmits data in a maximum number of data streams in same frequency resources and a second type user as assuming that during the data reception, the base station transmits data in a less number of data streams than the maximum number in the same frequency resources; a UE apparatus obtaining demodulation information of an own station from a PDCCH of a reception signal; the UE apparatus determining whether the own station belongs to the first type user or the second type user and determining demodulation information to use in channel estimation of multi-user interference signals based on whether the own station belongs to the first type user or the second type user; performing channel estimation of a downlink data channel of the own station based on the demodulation information of the own station, performing channel estimation of a multi-user interference signal in the reception signal based on the determined demodulation information to use in channel estimation of multi-user interference signals, and performing channel estimation of an inter-cell interference signal in the reception signal; generating a reception coefficient based on channel estimation results; and performing data detection on a PDSCH of the reception signal based on the generated reception coefficient and obtaining data transmitted from the base station to the own station.

Here, in the step of the UE apparatus determining whether the own station belongs to the first type user or the second type user, the UE apparatus determines whether the own station belongs to the first type user or the second type user based on a geographic position of the own station, and when a distance between the own station and a serving base station of the own station is equal to or smaller than a predetermined threshold, the UE apparatus determines that the own station belongs to the first type user and when the distance between the own station and the serving base station is greater than the predetermined threshold, the UE apparatus determines that the own station belongs to the second type user.

Specifically, the UE apparatus compares RSRP/RSRQ of a serving base station of the own station with RSRP/RSRQ of a neighbor cell, when a difference between the RSRP/RSRQ of the serving base station of the own station and a maximum value of the RSRP/RSRQ of the neighbor cell is equal to or greater than a predetermined threshold, the UE apparatus determines that the own station belongs to the first type user and when the difference between the RSRP/RSRQ of the serving base station and the maximum value of the RSRP/RSRQ of the neighbor cell is smaller than the predetermined threshold, the UE apparatus determines that the own station belongs to the second type user. In the step of determining the demodulation information to use in channel estimation of multi-user interference signals, when it is determined that the own station belongs to the first type user, the UE apparatus determines all combinations of DM-RS port ID and SCID excluding a DM-RS port ID and an SCID used by the own station as the demodulation information to use in channel estimation of multi-user interference signals and when it is determined that the own station belongs to the second type user, the UE apparatus determines null as the demodulation information to use in channel estimation of multi-user interference signals.

Or, in the step of the UE apparatus determining whether the own station belongs to the first type user or the second type user, the UE apparatus determines whether the own station belongs to the first type user or the second type user based on a DM-RS port ID and an SCID of the own station, and in the step of determining the demodulation information to use in channel estimation of multi-user interference signals, the UE apparatus determines combinations of DM-RS port ID and SCID such that the DM-RS port ID and/or the SCID is smaller than the DM-RS port ID and/or the SCID used by the own station as the demodulation information to use in channel estimation of multi-user interference signals.

Yet another aspect of the present invention is a channel estimating method for MUI signals, comprising the steps of: defining a first type user as assuming that during data reception, a base station transmits data in a maximum number of data streams in same frequency resources and a second type user as assuming that during the data reception, the base station transmits data in a less number of data streams than the maximum number in the same frequency resources; a UE apparatus determining whether an own station belongs to the first type user or the second type user and determining demodulation information to use in channel estimation of multi-user interference signals based on whether the own station belongs to the first type user or the second type user; and performing channel estimation of a multi-user interference signal based on the determined demodulation information to use in channel estimation of multi-user interference signals.

Technical Advantage of the Invention

As is clear from the above, according to the present invention, there is no need to assume that the base station always transmits data in maximum number of data streams and UE apparatuses are classified by type and demodulation information to use in channel estimation of multi-user interference signals is determined depending on UE type, thereby making it possible to improve channel estimation accuracy. With this structure, it is possible to attain the aim to improve the performance of data reception and improve user and cell throughputs.

DESCRIPTION OF EMBODIMENTS

In order to clarify the purpose, solving means and merits of the present invention, the present invention will be described in detail below, by way of embodiments and with reference to the drawings.

Figure 2:
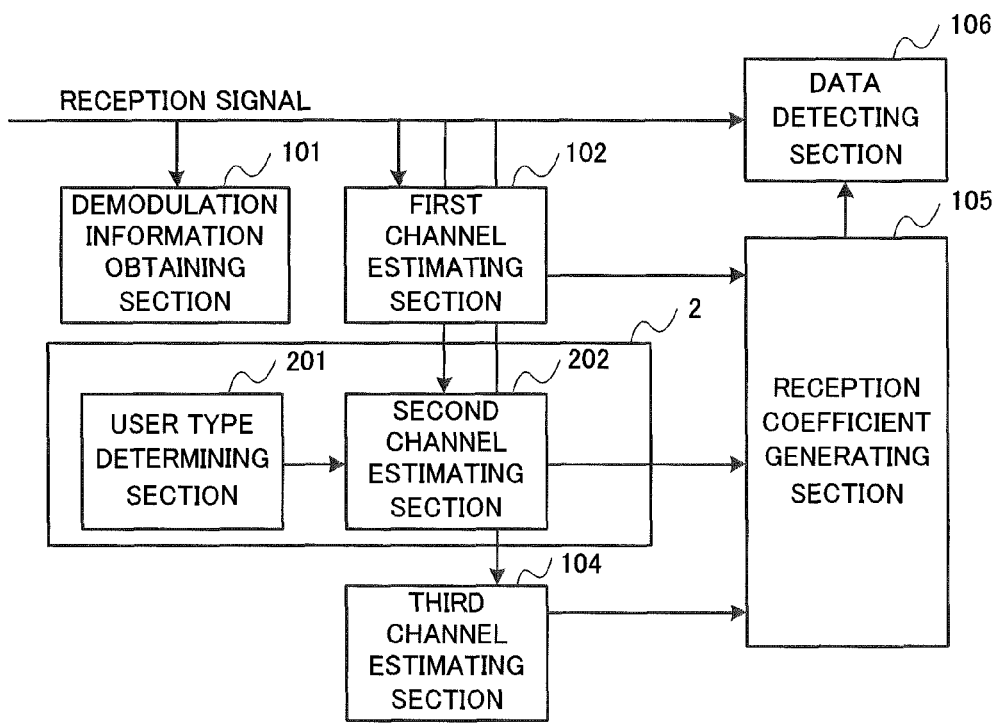
FIG. 2 is a diagram illustrating an inner structure of a receiving apparatus according to the present invention.

In order to improve the data reception performance, the present invention provides a receiving apparatus. As illustrated in FIG. 2, the receiving apparatus mainly has the following parts inside.

A demodulation information obtaining section 101 extracts demodulation information of the own station such as a DM-RS port ID and an SCID of the own station from a physical downlink control channel (PDCCH) of a reception signal.

A user type determining section 201 determines whether the UE apparatus corresponding to the own station belongs to a first type user or a second type user, and determines demodulation information to use in channel estimation of multi-user interference signals based on whether the UE apparatus corresponding to the own station belongs to the first type user or the second type user. The first type user is such that it is assumed that during data reception, a base station transmits data in maximum number of data streams in same frequency resources. The second type user is such that it is assumed that during data reception, the base station transmits data in less number of data streams than the maximum in the same frequency resources. For example, when the maximum number of data streams is 4, for the first type user, it is assumed that the number of data streams for the base station to transmit in the same frequency resources is 4 during data reception, and for the second type user, it is assumed that the number of data streams for the base station to transmit in the same frequency resources is less than 4.

A first channel estimating section 102 performs channel estimation on the downlink data channel of the own station based on the demodulation information of the own station.

A second channel estimating section 202 performs channel estimation on a MUI signal in the reception signal based on the determined demodulation information to use in channel estimation of MUI signals.

A third channel estimating section 104 performs channel estimation on an ICI signal in the reception signal.

A reception coefficient generating section 105 uses the channel estimation results of the first channel estimating section 102, the second channel estimating section 202 and the third channel estimating section 104 as a basis to generate a reception coefficient.

A data detecting section 106 uses the generated reception coefficient as a basis to perform data detection on the physical downlink shared channel (PDSCH) in the reception signal and obtains downlink data transmitted from the base station to the own station.

After receiving the signal, the receiving apparatus may need to perform conversion from a time domain into a frequency domain (for example, FFT: fast Fourier transform) on the reception signal, and then, the converted signal is forwarded to the demodulation information obtaining section 101, which should be understood by a person of ordinary skill in the art. And, in order to perform operations such as handover and cell selection, the above-mentioned receiving apparatus has to be equipped with a module to measure RSRP or RSRQ of the reception signal.

Figure 1:
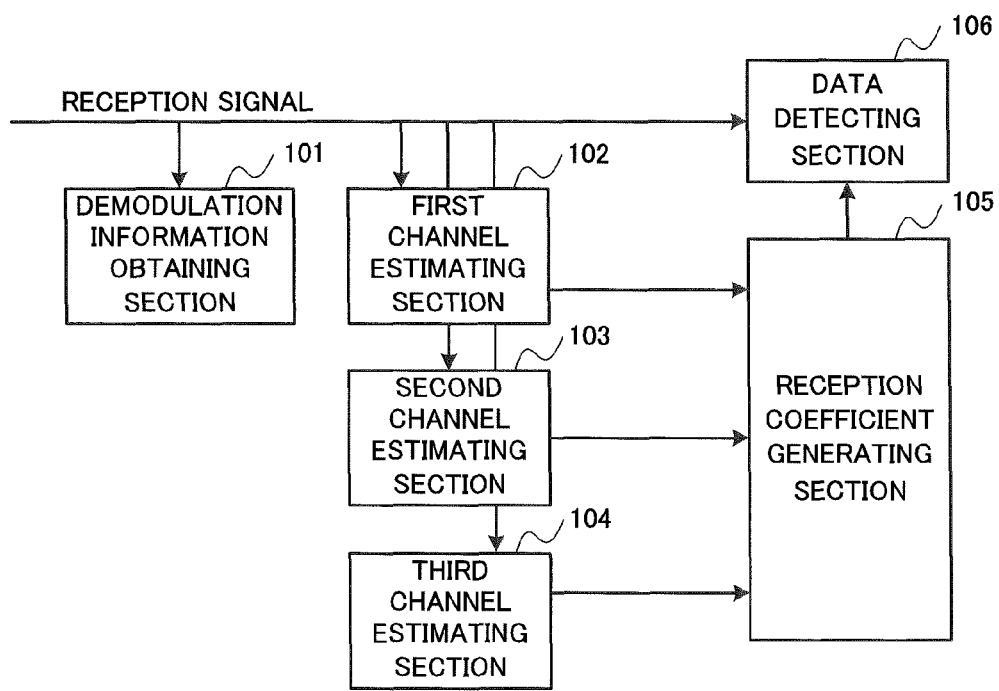
FIG. 1 is a diagram illustrating an inner structure of a conventional IRC receiving apparatus.

As compared with the inner structure of the conventional IRC illustrated in FIG. 1, the greatest difference between the receiving apparatus of the present invention and the conventional IRC is that in the present invention, the conventional second channel estimating section 103 is replaced with the user type determining section 201 and the second channel estimating section 202 to perform channel estimation on the MUI signal in the reception signal. In the present invention, the above-mentioned user type determining section 201 and second channel estimating section 202 are combined to be called a "MUI signal channel estimating apparatus 2". As a matter to be explained, the above-mentioned MUI signal channel estimating apparatus 2 can be applied to another receiving apparatus.

Figure 3:
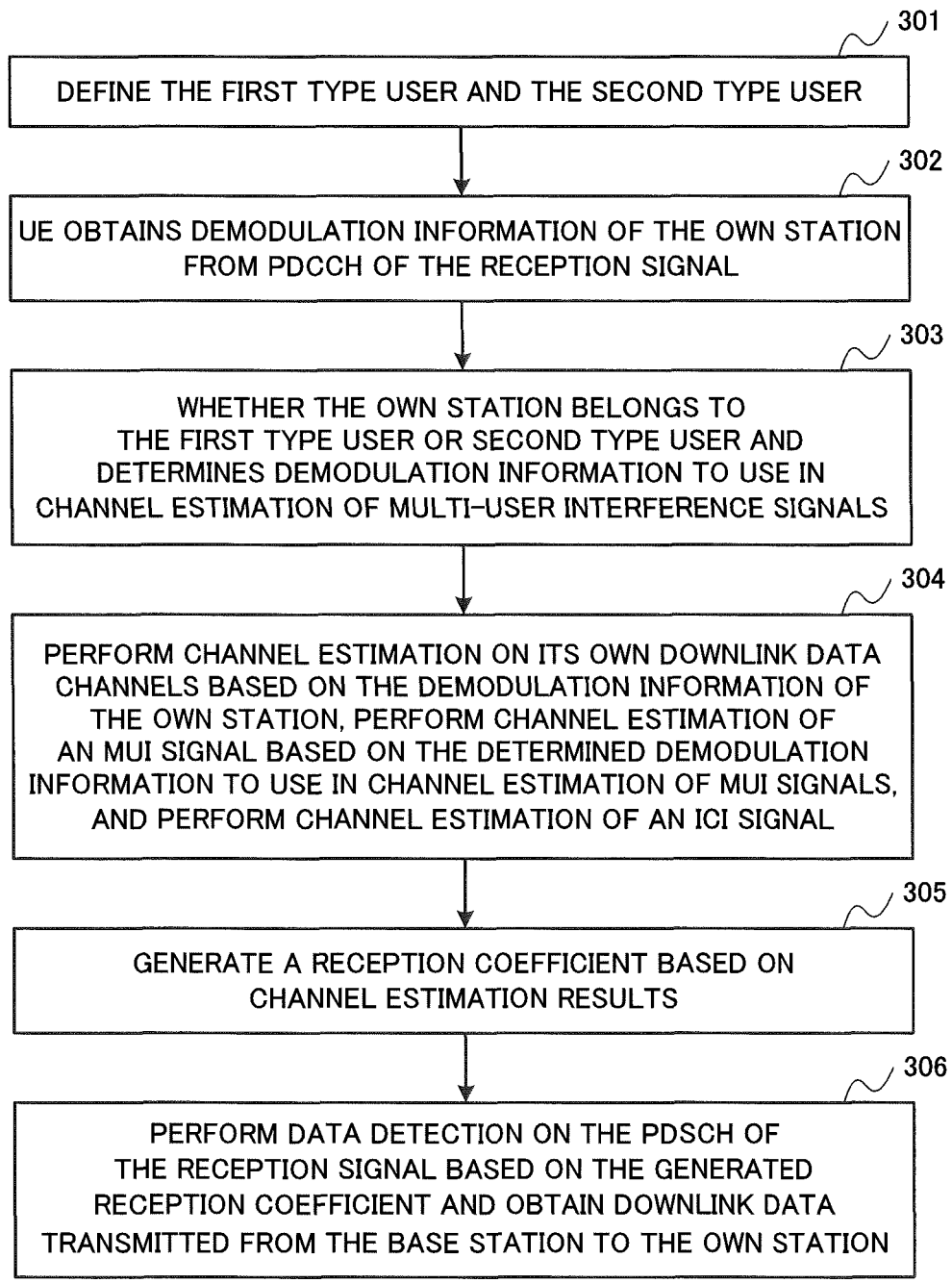
FIG. 3 is a flowchart of a data receiving method according to the present invention.

The present invention also provides a data receiving method corresponding to the above-mentioned receiving apparatus. As illustrated in FIG. 3, this method mainly includes the following steps in a flowchart.

In the step 301, definition is made of a first type user and a second type user. The first type user is defined as assuming that during data reception, a base station transmits data in a maximum number of data streams in same frequency resources. The second type user is defined as assuming that during data reception, the base station transmits data in a less number of data streams than maximum in the same frequency resources.

In the step 302, the UE apparatus obtains demodulation information of its own station such as a DM-RS port ID or an SCID from the PDCCH of a reception signal.

In the step 303, the UE apparatus determines whether the own station belongs to the first type user or the second type user, and it determines demodulation information to use in channel estimation of multi-user interference signals based on whether he UE apparatus corresponding to the own station belongs to the first type user or the second type user.

In the step 304, the UE apparatus performs channel estimation on the downlink data channel of its own station based on the demodulation information of the own station, performs channel estimation on an MUI signal based on the determined demodulation information to use in channel estimation of MUI signals and performs channel estimation on an ICI signal.

In the step 305, it generates a reception coefficient based on the channel estimation results.

In the step 306, it performs data detection on the PDSCH of the reception signal based on the generated reception coefficient and obtains downlink data transmitted to the own station from the base station.

As a matter to be explained, a part for performing channel estimation on the MUI signal based on the determined demodulation information to use in channel estimation of MUI signals in the above-mentioned process steps 301, 303 and 304 can be applied to another conventional data receiving method as a channel estimating method for MUI signals by itself.

As is clear from the above-described data receiving method and the above-described inner structure of the receiving apparatus and the inner structure of the MUI signal channel estimating apparatus 2, according to the present invention, there is no need to assume that the base station always transmit data in the maximum number of data streams. The UE apparatus is classified under the first type user called full-rank type and the second type user called non-full-rank type, and this UE type is used as a basis to determine demodulation information to use in channel estimation of multi-user interference signals, thereby improving the accuracy of channel estimation. In other words, in performing channel estimation on the multi-user interference signal, the first type user is able to immediately determine demodulation information to use in channel estimation on multi-user interference signals by assuming that the base station transmits data in the maximum number of data streams in the same frequency resources. The second type user needs to determine demodulation information to use in channel estimation on the multi-user interference signals based on the demodulation information of the own station. With this structure, it is possible to attain the aim of improving the performance in data reception and improve user and cell throughputs.

The following description is made, by way of specific embodiments, about, in the above-described receiving apparatus and data receiving method, the method for the UE apparatus determining whether the own station belongs to the first type user or the second type user and using the demodulation information of the own station and whether the UE apparatus corresponding to the own station belongs to the first type user or the second type user as a basis to determine demodulation information to use in channel estimation on multi-user interference signals.

(Embodiment 1)

In the embodiment 1, the UE apparatus determines whether the own station belongs to the first type user or the second type user based on the geographic position of the own station. More specifically, the above-mentioned geographic position is any one or any combination of parameters such as a distance between the UE apparatus and its serving base station, a path loss from the serving base station to the UE apparatus, the influence of shadow fading and neighbor cell interference. For example, when the distance between the own station and the serving base station is equal to or less than a predetermined threshold (close to the serving base station), it determines that the own station belongs to the first type user, and when the distance between the own station and the serving base station is greater than the predetermined threshold (far away from the serving base station), it determines that the own station belongs to the second type user. Or, when the path loss from the serving base station to the own station is equal to or less than a predetermined threshold (close to the serving base station), it determines that the own station belongs to the first type user, and when the path loss from the serving base station to the base station is greater than the predetermined threshold (far away from the serving base station), it determines that the own station belongs to the second type user. Or, when the neighbor cell interference is equal to or less than a predetermined threshold (close to the serving base station), it determines that the own station belongs to the first type user, and when the neighbor cell interference is greater than the predetermined threshold (far away from the serving base station), it determines that the own station belongs to the second type user. As described above, the fundamental principle to determine whether the UE apparatus belongs to the first type user or the second type user is such that when the UE apparatus is close to the serving base station, it belongs to the first type user, while when the UE apparatus is far away from the serving base station, it belongs to the second type user. As there are many parameters that can represent the geographic position of the UE apparatus, it is difficult to explain each of them. However, a person of ordinary skill in the art would understand that simple modifications and alterations to the above-described method all fall within the scope of protection of the present invention.

Figure 4:
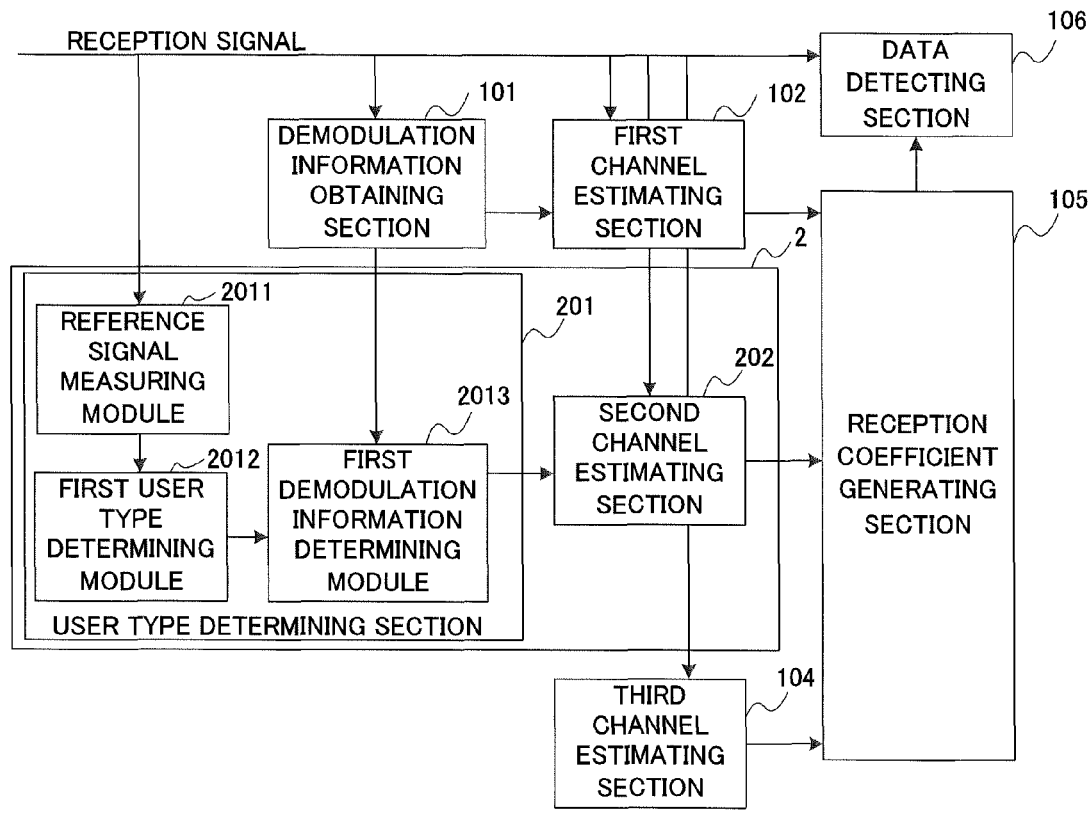
FIG. 4 is a diagram illustrating an inner structure of a receiving apparatus according to an embodiment 1 of the present invention.

In an actual application, the distance between the own station and the serving base station may be expressed by using RSRP/RSRQ of a reception signal. In this case, as illustrated in FIG. 4, the inner structure of the above-mentioned receiving apparatus mainly has the following.

A demodulation information obtaining section 101 extracts demodulation information of the own station such as a DM-RS port ID and an SCID of the own station from the PDCCH of a reception signal.

A user type determining section 201 has a reference signal measuring module 2011, a first user type determining module 2012 and a first demodulation information determining module 2013.

Note that the reference signal measuring module 2011 measures RSRP or RSRQ of the serving base station of the own station in the reception signal and RSRP or RSRQ of its neighbor cell.

The first user type determining module 2012 compares the RSRP/RSRQ of the serving base station of the own station and the RSRP/RSRQ of the neighbor cell, and when a difference between the RSRP/RSRQ of the serving base station of the own station and the maximum value of the RSRP/RSRQ of the neighbor cell is equal to or greater than a predetermined threshold, it determines that the own station belongs to the first type user, while when the difference between the RSRP/RSRQ of the serving base station of the own station and the maximum value of the RSRP/RSRQ of the neighbor cell is less than the predetermined threshold, it determines that the own station belongs to the second type user.

When it is determined that the own station belongs to the first type user, the first demodulation information determining module 2013 determines, as demodulation information to use in channel estimation of multi-user interference signals, all combinations of DM-RS port ID and SCID excluding the DM-RS port ID and SCID used by the own station, and when it is determined that the own station belongs to the second type user, it determines null as the demodulation information to user in channel estimation of multi-user interference signals, and there is no need to perform channel estimation of the multi-user interference.

A first channel estimating section 102 performs channel estimation on the downlink data channel of the own station based on the demodulation information of the own station.

A second channel estimating section 202 uses the determined demodulation information to use in channel estimation of MUI signals as a basis to perform channel estimation on an MUI signal in the reception signal.

A third channel estimating section 104 performs channel estimation on an ICI signal in the reception signal.

A reception coefficient generating section 105 uses the channel estimation results of the first channel estimating section 102, the second channel estimating section 202 and the third channel estimating section 104 as a basis to generate a reception coefficient.

A data detecting section 106 performs data detection on the physical downlink shared channel (PDSCH) of the reception signal based on the generated reception coefficient and obtains downlink data transmitted from the base station to the own station.

In this embodiment, the above-described user type determining section 201 and the second channel estimating section 202 may be combined to be called an MUI signal channel estimating apparatus 2 and may be applied to another receiving apparatus.

In this embodiment, there is also provided a data receiving apparatus corresponding to the above-described receiving apparatus. As compared to the method illustrated in FIG. 3, an improvement to the present embodiment is mainly in the step 303. In this step 303, first, the UE apparatus measures RSRP or RSRQ of the serving base station of the own station in the reception signal and RSRP or RSRQ of the neighbor cell, and compares the RSRP or RSRQ of the serving base station of the own station with the RSRP or RSRQ of the neighbor cell. When a difference between the RSRP or RSRQ of the serving base station of the own station and the maximum value of the RSRP or RSRQ of the neighbor cell is equal to or greater than a predetermined threshold, it determines that the own station belongs to the first type user, and then, determines, as the demodulation information to use in channel estimation of multi-user interference signals, all combinations of DM-RS port ID and SCID excluding the DM-RS port ID and SCID used by the own station. When the difference between the RSRP or RSRQ of the serving base station of the own station and the maximum value of the RSRP or RSRQ of the neighbor cell is less than the predetermined threshold, it determines that the own station belongs to the second type user and determines null as the demodulation information to use in channel estimation of multi-user interference signals. That is, there is no need to perform channel estimation of multi-user interference.

In this example, the UE apparatus is classified by type based on the geographic position of the UE apparatus. Note that for a full-rank type user which is close to the serving base station (difference of RSRP/RSRQ is greater or good signal to noise ratio), is assumed that the base station always transmits data in the maximum number of data streams during channel estimation of MUI, while for a non-full-rank type user which is far away from the serving base station (difference of RSRP/RSRQ is smaller or poor signal to noise ratio), there is no need to perform channel estimation of multi-user interference. In this case, the UE apparatus is considered to recognize the own station as a SU-MIMO user in channel estimation of MUI. With the receiving apparatus having the structure of the present embodiment and the data receiving method according to the present embodiment, as channel estimation of MUI signals can be prevented when the signal to noise radio is low, it is possible to improve the accuracy of channel estimation results and improve the performance of data reception.

(Embodiment 2)

Figure 5:
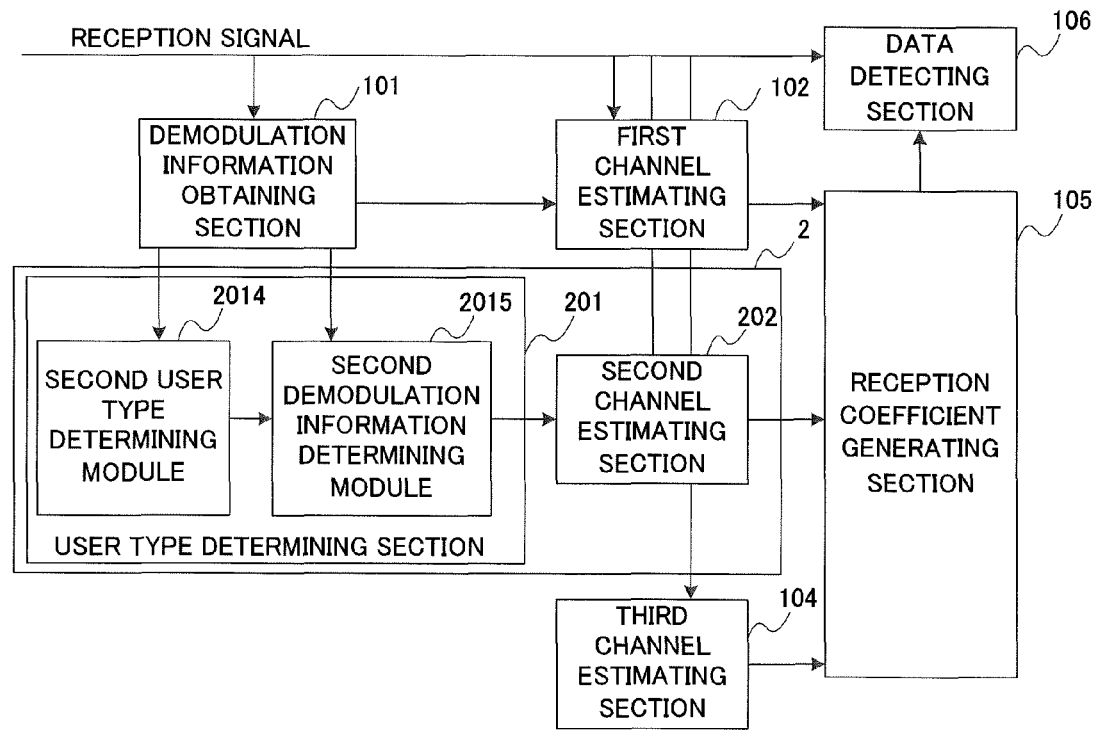
FIG. 5 is a diagram illustrating an inner structure of a receiving apparatus according to an embodiment 2 of the present invention.

In the second embodiment 2, the UE apparatus determines whether the own station belongs to the first type user or the second type user based on the demodulation information of the own station. As described above, the demodulation information includes a DM-RS port ID and an SCID. When the base station assigns DM-RS ports and SCIDs to UE apparatuses in ascending order, DM-RS port IDs and SCIDs which are smaller than the DM-RS port ID and/or SCID values can be only assigned to other UE apparatuses. In this case, as illustrated in FIG. 5, the inner structure of the above-mentioned receiving apparatus mainly has the following.

A demodulation information obtaining section 101 extracts demodulation information of the own station such as a DM-RS port ID and an SCID of the own station from the PDCCH of the reception signal.

A user type determining section 201 has a second user type determining module 2014 and a second demodulation information determining module 2015.

Note that the second user type determining module 2014 determines whether the own station belongs to the first type user or the second type user based on the demodulation information of the own station.

When it is determined that the own station belongs to the first type user, the second demodulation information determining module 2015 determines all combinations of DM-RS port ID and SCID excluding the DM-RS port ID and SCID used by the own station as demodulation information to use in channel estimation of multi-user interference signals. When it is determined that the own station belongs to the second type user, it determines demodulation information to use in channel estimation of multi-user interference signals based on the demodulation information of the own station.

A first channel estimating section 102 performs channel estimation on the downlink data channel of the own station based on the demodulation information of the own station.

A second channel estimating section 202 uses the determined demodulation information to use in channel estimation of MUI signals as a basis to perform channel estimation of an MUI signal in the reception signal.

A third channel estimating section 104 performs channel estimation on an ICI signal in the reception signal.

A reception coefficient generating section 105 uses channel estimating results of the first channel estimating section 102, the second channel estimating section 202 and the third channel estimating section 104 as a basis to generates a reception coefficient.

A data detecting section 106 performs data detection on the physical downlink shared channel (PDSCH) in the reception signal based on the generated reception coefficient and obtains downlink data transmitted from the base station to the own station.

Based on the above-described idea, determination whether the own station belongs to the first type user or the second type user is made by one of the following rules.

(Rule 1)

When the DM-RS port ID is greater than a predetermined threshold (for example, 7) and the SCID is 1, it is determined that the own station belongs to the first type user. When the DM-RS port ID is greater than the predetermined threshold and the SCID is not 1, it is determined that the own station belongs to the second type user.

(Rule 2)

When the DM-RS port ID is greater than a predetermined threshold (for example, 7), it is determined that the own station belongs to the first type user and, when the DM-RS port ID is not greater than the predetermined threshold, it is determined that the own station belongs to the second type user.

(Rule 3)

When the SCID is 1, it is determined that the own station belongs to the first type user and when the SCID is not 1, it is determined that the own station belongs to the second type user.

When the above-mentioned rule 1 is adopted, the above-described second user type determining module 2014 determines whether the DM-RS port ID is greater than a predetermined threshold (for example, 7) or not and whether the SCID is 1 or not. When it is determined that the DM-RS port ID is greater than the predetermined threshold and the SCID is 1, it is determined that the own station belongs to the first type user. When it is determined that the DM-RS port ID is greater than the predetermined threshold but the SCID is not 1, it is determined that the own station belongs to the second type user. At this point, when it is determined that the own station belongs to the first type user, the second demodulation information determining module 2015 determines, as demodulation information to use in channel estimation of multi-user interference signals, all combinations of DM-RS port ID and SCID excluding the DM-RS port ID and SCID used by the own station. When it is determined that the own station belongs to the second type user, it determines, as demodulation information to use in channel estimation of multi-user interference signals, combinations of DM-RS port ID and SCID which are smaller than the DM-RS port ID and/or SCID used by the own station. For example, when the DM-RS port ID and SCID used by the own station are 8 and 0, respectively, combinations of any DM-RS port ID of 1 to 7 and SCID 0 can be determined as demodulation information to use in channel estimation of multi-user interference signals. Or, combinations of any DM-RS port ID of 1 to 7 and SCID 0 or 1 can be determined as demodulation information to use in channel estimation of multi-user interference signals.

When the above-mentioned rule 2 is adopted, the above-mentioned second user type determining module 2014 determines whether or not the DM-RS port ID is greater than a predetermined threshold (for example, 7). When the DM-RS port ID is greater than the predetermined threshold, it is determined that the own station belongs to the first type user and when the DM-RS port ID is not greater than the predetermined threshold, it is determined that the own station belongs to the second type user. At this point, when it is determined that the own station belongs to the first type user, the second demodulation information determining module 2015 determines, as demodulation information to use in channel estimation of multi-user interference signals, all combinations of DM-RS port ID and SCID excluding the DM-RS port ID and SCID used by the own station. When it is determined that the own station belongs to the second type user, it determines, as demodulation information to use in channel estimation of multi-user interference signals, combinations of any DM-RS port ID which is smaller than the DM-RS port ID used by the own station and any SCID. For example, when the DM-RS port ID and SCID used by the own station are 7 (equal to or smaller than the predetermined threshold) and 1, respectively, combinations of any DM-RS port ID of 1 to 6 and SCID 0 or 1 can be determined as demodulation information to use in channel estimation of multi-user interference signals.

When the above-mentioned rule 3 is adopted, the above-mentioned second user type determining module 2014 determines whether the SCID is 1 or not. When the SCID is 1, it is determined that the own station belongs to the first type user and when the SCID is not 1, it is determined that the own station belongs to the second type user. At this point, when it is determined that the own station belongs to the first type user, the second demodulation information determining module 2015 determines, as demodulation information to use in channel estimation of multi-user interference signals, all combinations of DM-RS port ID and SCID excluding the DM-RS port ID and SCID used by the own station. When it is determined that the own station belongs to the second type user, it determines, as demodulation information to use in channel estimation of multi-user interference signals, combinations of any DM-RS port ID which is smaller than the DM-RS port ID used by the own station and SCID "0". For example, when the DM-RS port ID and SCID used by the own station are 8 and 0, respectively, combinations of any DM-RS port ID of 1 to 7 and SCID 0 can be determined as demodulation information to use in channel estimation of multi-user interference signals.

In this embodiment, the above-mentioned user type determining section 201 and the second channel estimating section 202 are combined to be called a MUI signal channel estimating apparatus 2, which may be applied to another receiving apparatus.

In this embodiment, there is also provided a data receiving method corresponding to the above-described receiving apparatus. As compared to the method illustrated in FIG. 3, an improvement to the present embodiment is mainly in the step 303. In this embodiment, the UE apparatus determines whether the own station belongs to the first type user or the second type user based on the DM-RS port ID and SCID of the own station, and uses, as the demodulation information to use in channel estimation of multi-user interference signals, only combinations of DM-RS port ID and SCID such that the DM-RS port ID and/or SCID is smaller than the DM-RS port ID and/or SCID of the own station. That is, it determines, as the demodulation information to use in channel estimation of multi-user interference signals, combinations of DM-RS port ID and SCID such that the DM-RS port ID and/or SCID is smaller than the DM-RS port ID and/or SCID of the own station. Therefore, in the present embodiment, as the rule of classifying UE apparatuses under different types based on demodulation information of the UE apparatuses and allocating the demodulation information in ascending order is used, for the full-rank type user, it is still assumed that the base station transmits data in maximum number of data streams in channel estimation of MUI signals, while for the non-full-rank type user, channel estimation is performed on MUI signals based on any combination of DM-RS port ID and SCID such that the DM-RS port ID and/or SCID is smaller than the DM-RS port ID and/or SCID of the own station. In this way, according to the receiving apparatus having the structure of the present embodiment and the data receiving method according to the present embodiment, it is possible to improve accuracy of channel estimation results when a signal to noise ratio is low and improve the performance of data reception.

As a matter to be explained, in the above-described embodiment 2, the demodulation information is arranged in ascending order and assigned. However, a person of ordinary skill in the art would understand that even if the demodulation information is assigned in another manner (for example, in descending order), as long as there is a fixed rule in allocation, it is possible to determine demodulation information to use in channel estimation of MUI signals by adopting a modified embodiment analogue to the present embodiment and classifying the UE apparatus based on the demodulation information of the UE apparatus, without departing from the scope of protection of the present invention.

(Embodiment 3)

The embodiment 3 is a combination of the method according to the embodiment 1 and the method according to the embodiment 2. In the embodiment 3, the UE apparatus determines whether the own station belongs to the first type user or the second type user based on the demodulation information of the own station and the geographic position of the own station.

For example, first, the method according to the embodiment 1 is used to determine whether or not the own station is a user far away from a corresponding serving base station (a RSRP/RSRQ difference is small, that is, a signal to noise radio is poor). When it is determined that the own station is a user far away from the serving base station, it determines that it is not necessary for the own station to perform channel estimation of multi-user interference, that is, it recognizes the own station as a SU-MIMO user. When it is determined that the own station is a user close to the serving base station (the RSRP/RSRQ difference is great and the signal to noise ratio is good) by the method according to the embodiment 1, it further determines whether the own station belongs to the first type user or the second type user by the method according to the embodiment 2. Then, it can determine the demodulation information to use in channel estimation of multi-user interference signals by the method according to the embodiment 2.

Or, first, it determines whether the own station belongs to the first type user or not by the method according to the embodiment 2. When it is determined that the own station belongs to the first type user, it determines, as demodulation information to use in channel estimation of multi-user interference signals, all combinations of DM-RS port ID and SCID excluding the DM-RS port ID and SCID used by the own station. When it is determined that the own station does not belong to the first type user, it further determines whether or not the own station is a user far away from a corresponding serving base station (a RSRP/RSRQ difference is small, that is, a signal to noise ratio is poor) When it is determined that the own station is a user far away from the serving base station, it determines that it is not necessary for the own station to perform channel estimation of multi-user interference, that is, it recognizes the own station as a SU-MIMO user. When it is determined that the own station is a user close to the corresponding serving base station (the RSP/RSRQ difference is great and the signal to noise ratio is good) by the method according to the embodiment 1, it determines the demodulation information to use in channel estimation of multi-user interference signals by the method according to the embodiment 2.

In the embodiment 3, the UE apparatus is actually classified under the full-rank type user, the non-full-rank type user and the SU-MIMO user which does not require channel estimation of MUI signals. Use of this more detailed classification makes it possible to perform accurate channel estimation, improve the performance of data reception and increase UE and cell throughputs.

For the purpose of better explanation of advantageous effects of the receiving apparatus and the data receiving method according to the present invention, the conventional system using an IRC receiving apparatus, an ideal system and systems adopting receiving apparatuses according to the embodiments 1 and 2 of the present invention were simulated to obtain their cell-average throughputs and cell-edge throughputs, assuming that there are 10 UE apparatuses in each sector. Simulation results are presented in the following table 1.

TABLE 1

| System level simulation (10 UE apparatuses per sector) | | Cell-average throughput | Cell-edge throughput |
|---|---|---|---|
| Conventional system with IRC receiving apparatus | | 27.77 Mbps | 1.1828 Mbps |
| Ideal system | | 29.42 Mbps (5.94%) | 1.3089 Mbps (10.66%) |
| Embodiment 1 | Threshold: 3 dB | 28.45 Mbps (2.45%) | 1.2548 Mbps (6.09%) |
| | Threshold: 6 dB | 28.89 Mbps (4.03%) | 1.2865 Mbps (8.77%) |

TABLE 1-continued

| System level simulation (10 UE apparatuses per sector) | Cell-average throughput | Cell-edge throughput |
|---|---|---|
| Threshold: 9 dB | 29.06 Mbps (4.65%) | 1.2965 Mbps (9.61%) |
| Threshold: 12 dB | 29.04 Mbps (4.57%) | 1.2983 Mbps (9.76%) |
| Embodiment 2 | 28.79 Mbps (3.67%) | 1.2869 Mbps (8.80%) |

As is clear from the table 1 presented above, according to the methods of the embodiments 1 and 2, it is possible to improve the cell-average throughput and cell-edge throughput to different degrees so as to be close to the throughput of the ideal system. That is, in the method according to the embodiment 1, it is also possible to change the cell-average throughput and cell-edge throughput by adjusting a predetermined threshold (threshold of RSRP/SRQ difference).

The preferable embodiments of the present invention described up to this point have been provided for illustrative purposes only and are not intended to limit the scope of the present invention. It should be noted that various modifications, equivalent replacement and improvements made in the spirit and principle of the present invention fall within the scope of protection of the present invention.

The disclosure of Chinese Patent Application No. 201110111902.9, filed on Apr. 22, 2011, including the specification, drawings, and abstract, is incorporated herein by reference in its entirety.

The invention claimed is:

1. A receiving apparatus comprising:
a demodulation information obtaining circuit that extracts demodulation information of an own station from a physical downlink control channel (PDCCH) of a reception signal;
a user type determining circuit that
determines whether a UE apparatus corresponding to the own station belongs to a first type user or a second type user,
wherein the first type user is a UE apparatus that only knows its own data demodulation information and does not know whether or not there exists another UE apparatus in a present coordinated transmission group and during data reception, a base station transmits data in a maximum number of data streams that share same frequency resources
and the second type user is a UE apparatus that recognizes not only its own data demodulation information but also demodulation information of other UE apparatuses in the present coordinated transmission group and during the data reception, the base station transmits data in fewer than the maximum number of data streams that share the same frequency resources, and
determines demodulation information to use in channel estimation of multi-user interference signals based on whether the UE apparatus corresponding to the own station belongs to the first type user or the second type user;
a first channel estimating circuit that performs channel estimation of a downlink data channel of the own station based on the demodulation information of the own station;
a second channel estimating circuit that performs channel estimation of a multi-user interference signal in the reception signal based on the determined demodulation information to use in channel estimation of multi-user interference signals;

a third channel estimating circuit that performs channel estimation of an inter-cell interference signal in the reception signal;

a reception coefficient generating circuit that generates a reception coefficient based on channel estimation results of the first channel estimating circuit, the second channel estimating circuit and the third channel estimating circuit; and a data detecting circuit that performs data detection on a physical downlink shared channel (PDSCH) of the reception signal based on the generated reception coefficient.

2. The receiving apparatus of claim 1, wherein the user type determining circuit comprises:

a reference signal measuring circuit that measures reference signal reception power (RSRP) or reference signal reception quality (RSRQ) of a serving base station of the own station in the reception signal and RSRP or RSRQ of a neighbor cell;

a first user type determining circuit that compares the RSRP or RSRQ of the serving base station of the own station with the RSRP or RSRQ of the neighbor cell and, when a difference between the RSRP or RSRQ of the serving base station of the own station and a maximum value of the RSRP or RSRQ of the neighbor cell is equal to or greater than a predetermined threshold, determines that the own station belongs to the first type user and when the difference between the RSRP or RSRQ of the serving base station and the maximum value of the RSRP or RSRQ of the neighbor cell is smaller than the predetermined threshold, determines that the own station belongs to the second type user; and a first demodulation information determining circuit that, when it is determined that the own station belongs to the first type user, determines all combinations of DM-RS (demodulation reference signal) port ID and SCID (scramble sequence index) excluding DM-RS port ID and SCID used by the own station as the demodulation information to use in channel estimation of multi-user interference signals and, when it is determined that the own station belongs to the second type user, determines null as the demodulation information to use in channel estimation of multi-user interference signals.

3. The receiving apparatus of claim 1, wherein the user type determining circuit comprises:

a second user type determining circuit that determines whether the own station belongs to the first type user or the second type user based on the demodulation information of the own station; and a second demodulation information determining circuit that, when it is determined that the own station belongs to the first type user, determines all combinations of DM-RS port ID and SCID excluding a DM-RS port ID and an SCID used by the own station as the demodulation information to use in channel estimation of multi-user interference signals and, when it is determined that the own station belongs to the second type user, determines the demodulation information to use in channel estimation of multi-user interference signals based on the demodulation information of the own station.

4. The receiving apparatus of claim 3, wherein the second user type determining circuit determines whether the DM-RS port ID of the own station is greater than a predetermined threshold or not and whether the SCID of the own station is 1 or not, when the DM-RS port ID of the own station is greater than the predetermined threshold and the SCID is 1, the second user type determining circuit determines that the own station belongs to the first type user and when the DM-RS port ID of the own station is greater than the predetermined threshold and the SCID is not 1, the second user type determining circuit determines that the own station belongs to the second type user, and when it is determined that the own station belongs to the second type user, the second demodulation information determining circuit determines, as the demodulation information to use in channel estimation of multi-user interference signals, combinations of DM-RS port ID and SCID such that the DM-RS port ID and the SCID is smaller than the DM-RS port ID and the SCID used by the own station.

5. The receiving apparatus of claim 3, wherein the second user type determining circuit determines whether the DM-RS port ID is greater than a predetermined threshold or not, when it is determined that the DM-RS port ID is greater than the predetermined threshold, the second user type determining circuit determines that the own station belongs to the first type user and when it is determined that the DM-RS port ID is not greater than the predetermined threshold, the second user type determining circuit determines that the own station belongs to the second type user, and when it is determined that the own station belongs to the second type user, the second demodulation information determining circuit determines, as the demodulation information to use in channel estimation of multi-user interference signals, combinations of DM-RS port ID and SCID such that the DM-RS port ID is smaller than the DM-RS port ID used by the own station and the SCID is any SCID.

6. The receiving apparatus of claim 3, wherein the second user type determining circuit determines whether the SCID is 1 or not, when it is determined that the SCID is 1, the second user type determining circuit determines that the own station belongs to the first type user and when the SCID is not 1, the second user type determining circuit determines that the own station belongs to the second type user, and when it is determined that the own station belongs to the second type user, the second demodulation information determining circuit determines, as the demodulation information to use in channel estimation of multi-user interference signals, combinations of DM-RS port ID and SCID such that the SCID is 0 and the DM-RS port ID is smaller than the DM-RS port ID used by the own station.

7. A channel estimating apparatus for multi-user interference (MUI) signals, comprising:

a user type determining circuit that determines whether a UE apparatus corresponding to an own station belongs to a first type user or a second type user, wherein the first type user is a UE apparatus that only knows its own data demodulation information and does not know whether or not there exists another UE apparatus in a present coordinated transmission group and during data reception, a base station transmits data in a maximum number of data streams that share same frequency resources and the second type user is a UE apparatus that recognizes not only its own data demodulation information but also demodulation information of other UE apparatuses in the present coordinated transmission group and during the data reception, the base station transmits data in fewer than the maximum number of data streams that share the same frequency resources, and determines demodulation information to use in channel estimation of multi-user interference signals based on whether the UE apparatus corresponding to the own station belongs to the first type user or the second type user; and a second channel estimating circuit that performs channel estimation of a multi-user interference signal based on the determined demodulation information to use in channel estimation of multi-user interference signals.

8. A data receiving method comprising the steps of:

defining a first type user as a UE apparatus that only knows its own data demodulation information and does not know whether or not there exists another UE apparatus in a present coordinated transmission group and during data reception, a base station transmits data in a maximum number of data streams that share same frequency resources and a second type user as a UE apparatus that recognizes not only its own data demodulation information but also demodulation information of other UE apparatuses in the present coordinated transmission group and during the data reception, the base station transmits data in fewer than the maximum number of data streams that share the same frequency resources;

obtaining demodulation information of an own station, by a UE apparatus, from a PDCCH of a reception signal;

determining, by a UE apparatus, whether the own station belongs to the first type user or the second type user and determining demodulation information to use in channel estimation of multi-user interference signals based on whether the own station belongs to the first type user or the second type user;

performing channel estimation of a downlink data channel of the own station based on the demodulation information of the own station, performing channel estimation of a multi-user interference signal in the reception signal based on the determined demodulation information to use in channel estimation of multi-user interference signals, and performing channel estimation of an inter-cell interference signal in the reception signal;

generating a reception coefficient based on channel estimation results; and performing data detection on a PDSCH of the reception signal based on the generated reception coefficient and obtaining data transmitted from the base station to the own station.

9. The data receiving method of claim 8, wherein in the step of the UE apparatus determining whether the own station belongs to the first type user or the second type user, the UE apparatus determines whether the own station belongs to the first type user or the second type user based on a geographic position of the own station, and when a distance between the own station and a serving base station of the own station is equal to or smaller than a predetermined threshold, the UE apparatus determines that the own station belongs to the first type user and when the distance between the own station and the serving base station is greater than the predetermined threshold, the UE apparatus determines that the own station belongs to the second type user.

10. The data receiving method of claim 8, wherein in the step of determining, by the UE apparatus, whether the own station belongs to the first type user or the second type user, the UE apparatus compares RSRP or RSRQ of a serving base station of the own station with RSRP or RSRQ of a neighbor cell, when a difference between the RSRP or RSRQ of the serving base station of the own station and a maximum value of the RSRP or RSRQ of the neighbor cell is equal to or greater than a predetermined threshold, the UE apparatus determines that the own station belongs to the first type user and when the difference between the RSRP or RSRQ of the serving base station and the maximum value of the RSRP or RSRQ of the neighbor cell is smaller than the predetermined threshold, the UE apparatus determines that the own station belongs to the second type user, and in the step of determining the demodulation information to use in channel estimation of multi-user interference signals, when it is determined that the own station belongs to the first type user, the UE apparatus determines all combinations of DM-RS port ID and SCID excluding a DM-RS port ID and an SCID used by the own station as the demodulation information to use in channel estimation of multi-user interference signals and when it is determined that the own station belongs to the second type user, the UE apparatus determines null as the demodulation information to use in channel estimation of multi-user interference signals.

11. The data receiving method of claim 8, wherein in the step of determining, by a UE apparatus, whether the own station belongs to the first type user or the second type user, the UE apparatus determines whether the own station belongs to the first type user or the second type user based on a DM-RS port ID and an SCID of the own station, and in the step of determining the demodulation information to use in channel estimation of multi-user interference signals, the UE apparatus determines combinations of DM-RS port ID and SCID such that the DM-RS port ID and the SCID is smaller than the DM-RS port ID and the SCID used by the own station as the demodulation information to use in channel estimation of multi-user interference signals.

12. A channel estimating method for multi-user interference (MUI) signals, comprising the steps of:

defining a first type user as a UE apparatus that only knows its own data demodulation information and does not know whether or not there exists another UE apparatus in a present coordinated transmission group and during data reception, a base station transmits data in a maximum number of data streams that share same frequency resources and a second type user as a UE apparatus that recognizes not only its own data demodulation information but also demodulation information of other UE apparatuses in the present coordinated transmission group and during the data reception, the base station transmits data in fewer than the maximum number of data streams that share the same frequency resources;

determining, by a UE apparatus, whether an own station belongs to the first type user or the second type user and determining demodulation information to use in channel estimation of multi-user interference signals based on whether the own station belongs to the first type user or the second type user; and performing channel estimation of a multi-user interference signal based on the determined demodulation information to use in channel estimation of multi-user interference signals.

13. The receiving apparatus of claim 1, wherein the user type determining circuit determines whether the own station belongs to the first type user or the second type user based on a geographic position of the own station, or the demodulation information of the own station, or based on both the geographic position of the own station and the demodulation information of the own station.

14. The receiving apparatus of claim 1, wherein when the UE apparatus is defined as the first type, the base station transmits data in the maximum number of data streams during channel estimation of MUI signals.

* * * * *